US006747940B2

(12) United States Patent
Ohno

(10) Patent No.: US 6,747,940 B2
(45) Date of Patent: Jun. 8, 2004

(54) OPTICAL WRITING HEAD COMPRISING SELF-SCANNING LIGHT-EMITTING ELEMENT ARRAY

(75) Inventor: Seiji Ohno, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 269 days.

(21) Appl. No.: 09/936,118

(22) PCT Filed: Dec. 26, 2000

(86) PCT No.: PCT/JP00/09207

§ 371 (c)(1),
(2), (4) Date: Sep. 6, 2001

(87) PCT Pub. No.: WO01/49502

PCT Pub. Date: Jul. 12, 2001

(65) Prior Publication Data

US 2003/0058329 A1 Mar. 27, 2003

(30) Foreign Application Priority Data

May 24, 1999 (JP) ........................................ 2000-152913
Jan. 7, 2000 (JP) ........................................ 2000-001445

(51) Int. Cl.[7] ................................................ G11B 7/00
(52) U.S. Cl. ....................... 369/121; 369/116; 347/247; 347/237
(58) Field of Search ............................... 369/47.1, 47.5, 369/53.1, 59.1, 116, 121; 347/247, 237

(56) References Cited

U.S. PATENT DOCUMENTS 6,108,018 A 8/2000 Narita et al.
6,323,890 B1 * 11/2001 Muto et al. ................. 347/237
6,388,698 B1 * 5/2002 Deguchi et al. ............ 347/240

FOREIGN PATENT DOCUMENTS

| | | | |
|---|---|---|---|
| EP | 0 410 695 | A2 | 1/1991 |
| EP | 0 949 604 | A1 | 10/1999 |
| JP | 9 099581 | A | 4/1997 |
| JP | 10-114101 | | 5/1998 |
| JP | 11 028835 | A | 2/1999 |
| JP | 11 198429 | A | 7/1999 |

OTHER PUBLICATIONS

PCT International Search Report, Feb. 6, 2001.
European Search Report; Jun. 11, 2003.

* cited by examiner

*Primary Examiner*—Muhammad Edun
(74) *Attorney, Agent, or Firm*—RatnerPrestia

(57) ABSTRACT

An optical writing head in which the number of bus lines to be derived may be decreased by using a self-scanning light-emitting element array is provided. A Φ1 bonding pad of each SLED chip is connected to Φ1 bus line via a resistor R1, and a Φ2 bonding pad of each SLED chip is connected to Φ2 bus line via a resistor R2. $\Phi_S$ bonding pad is connected to a $\Phi_S$ bus line via resistor $R_S$, and $V_{GA}$ bonding pad is connected to $V_{GA}$ bus line. $\Phi_I$ bonding pad of each SLED chip is connected to a corresponding one of terminal $\Phi_I$(1) –$\Phi_I$(56) of a connector.

9 Claims, 18 Drawing Sheets

OPTICAL WRITING HEAD COMPRISING SELF-SCANNING LIGHT-EMITTING ELEMENT ARRAY

TECHNICAL FIELD

The present invention relates to an optical writing head, particularly to an optical writing head using a self-scanning light-emitting element array.

BACKGROUND ART

A light printer head, i.e. an optical writing head comprises a light-emitting element array in which a plurality of light-emitting elements are arrayed in one line. When an optical writing head is structured by using a light-emitting diode (LED) array, for example, as a light-emitting element array, about 7200 LEDs are arrayed in one line for an optical writing head of 600 dpi (dots per inch) which prints on an A3 size paper. In this optical writing head, an electrode of each LED is electrically connected to an electrode of a driving IC. A wire bonding is usually used for such electrical connection. An IC for driving n LEDs generally converts n serial data into n parallel data, thereby controlling the light emission condition of the n LEDs.

Therefore, the number of signal lines derived from the optical writing head is equal to that of the driving ICs except the signal lines for power supply and timing. In the case of excess number of signal lines in such structure, a particular driving IC is provided for distributing (serial-parallel conversion) data to m driving ICs so that the number of signal lines may be decreased by a factor of m.

In this manner, as the conventional optical writing head has lines the number thereof is equal to that of LEDs, it is difficult to interface with an external part otherwise the number of lines to be derived is decreased by serial-parallel conversion with the particular driving IC. The particular driving IC is mounted on the same substrate on which the LED array is mounted, then this causes the problem in that the width of the head, i.e. the width in a direction perpendicular to the direction of LED arrangement becomes large. There is also a problem in that the particular driving IC for serial-parallel conversion is to be provided in the head, resulting in a high production cost.

The inventors of the present invention have interested in a three-terminal light-emitting thyristor having a PNPN-structure as an elements of the light-emitting element array, and have already filed several patent applications (see Japanese Patent Publication Nos. 1-238962, 2-14584, 2-92650, and 2-92651.) These patent publications have disclosed that a self-scanning function for light-emitting elements may be implemented, and further have disclosed that such self-scanning light-emitting element array has a simple and compact structure for the light source of a printer, and has smaller arranging pitch of thyristors.

The inventors have further provided a self-scanning light-emitting element array having such structure that an array of light-emitting thyristors having transfer function as a shift register is separated from an array of light-emitting thyristor having writable function (see Japanese Patent Publication No.2-263668.)

DISCLOSURE OF THE INVENTION

The object of the present invention is to provide an optical writing head in which the number of bus lines to be derived may be decreased by using a self-scanning light-emitting element array.

One point light-emitting type of self-scanning light-emitting element array chip used in an optical writing head comprises the following basic structure.

That is, the one point light-emitting type of self-scanning light-emitting element array chip comprises;

a transfer element array having such a structure that a plurality of three-terminal transfer elements each having a control electrode for controlling threshold voltage or current are linearly arranged, the control electrodes of the transfer elements neighbored to each other are connected via an electrically unidirectional element, a power supply line is connected to all the control electrodes via respective load resistors, and n-phase (n is an integer$\geqq$2) clock lines are connected to one of two terminals other than the control electrode of each of the transfer elements, repeatedly at intervals of n transfer elements, and a light-emitting element array having such a structure that a plurality of three-terminal light-emitting elements each having a control electrode for controlling threshold voltage or current are linearly arranged, each control electrodes of the light-emitting element array is connected to the control electrodes of the corresponding transfer element, and a line for applying a write signal connected to one of two terminals other than the control electrode of each of the light-emitting elements is provided.

According to a first aspect of the optical writing head of the present invention, a plurality of chips described above are linearly arranged, a start pulse bus line is commonly connected to the respective chips, n-phases clock pulse bus lines are commonly connected to the respective chips, and write signal bus lines are separately connected to the respective chips.

According to a second aspect of the optical writing head of the present invention, current limiting resistors to be connected to the start pulse bus line, n-phase clock pulse bus lines, and write signal bus lines are included in the chip, in the optical head of the first aspect.

According to a third aspect of the optical writing head of the present invention, current limiting resistors to be connected to the n-phase clock pulse bus lines are included in the chip, in the optical writing head of the first aspect.

According to a forth aspect of the optical writing head of the present invention, a buffer IC is inserted in each of the n-phase clock pulse bus lines, in the optical head of the third aspect.

According to a fifth aspect of the optical writing head of the present invention, a two point light-emitting type of self-scanning light-emitting element array chip is used. In this aspect, a start pulse bus line is commonly connected to the respective chips, n-phases clock pulse bus lines are commonly connected to the respective chips, two write signal bus lines are separately connected to the respective chips, the two write signal bus lines are alternately connected to the light-emitting elements in each chip.

According to a sixth aspect of the optical writing head of the present invention, a plural light-emitting type of self-scanning light-emitting element array chip is used. The plural light-emitting type of self-scanning light-emitting element array chip comprises;

a transfer element array having such a structure that a plurality of three-terminal transfer elements each having a control electrode for controlling threshold voltage or current are linearly arranged, the control electrodes of the transfer elements neighbored to each other are connected via an electrically unidirectional element, a power supply line is connected to all the control electrodes via respective load resistors, and n-phase (n is an integer≧2) clock lines are connected via current limiting resistors to one of two terminals other than the control electrode of each of the transfer elements, repeatedly at intervals of n transfer elements, a light-emitting element array having such a structure that a plurality of three-terminal light-emitting elements each having a control electrode for controlling threshold voltage or current are linearly arranged, each control electrode of the light-emitting element array is connected to the control electrode of the corresponding transfer element at intervals at n elements, and a line for applying a write signal connected via a current limiting resistor to one of two terminals other than the control electrode of each of the light-emitting elements is provided.

In an optical writing head structured by linearly arranging the chips described above, start pulse bus line are separately connected to the respective chips, n-phases clock pulse bus lines are commonly connected to the respective chips, and a write signal bus line is commonly connected to the respective chips.

According to a seventh aspect of the present invention, in an optical writing head using one light-emitting type of self-scanning light-emitting element array chip, m (m is an integer≧2) start pulse bus line are repeatedly connected to the respective chips, n-phases clock pulse bus lines are commonly connected to the respective chips, write signal bus lines are separately connected to every m chip neighbored to each other, and current limiting resistors to be connected to the start pulse bus line, n-phase clock pulse bus lines, and write signal bus lines are included in the chip.

According to a eighth aspect of the present invention, in an optical writing head using one light-emitting type of self-scanning light-emitting element array chip, the plurality of chips are divided into groups each thereof including m (m is an integer≧2) chips, an end bonding pad of one chip is connected to the start pulse bonding of next chip in one group of chips, a start pulse bus line is commonly connected to a first chip of the respective groups, n-phase clock pulse bus lines are commonly connected to the respective chips, and write signal bus lines are separately connected to all the chips of the respective groups.

According to a ninth aspect of the present invention, in an optical writing head using the plural light-emitting type of self-scanning light-emitting element array chip, start pulse bus lines are separately connected to every m (m is an integer≧2) chips neighbored to each other, one-phase m clock pulse bus lines are repeatedly connected to the m chips neighbored to each other, another-phase clock pulse bus lines are commonly connected to the respective chips, and a write signal bus line is commonly connected to the respective chips.

BRIEF DESCRIPTION OF THE DRAWINGS

FIG. 5 shows an optical writing head according to an embodiment 2a.

FIGS. 6A, 6B show bonding pads and an equivalent circuit diagram of a SLED chip used in the embodiment 2a.

BEST MODE FOR CARRYING OUT THE INVENTION

Figure 1:
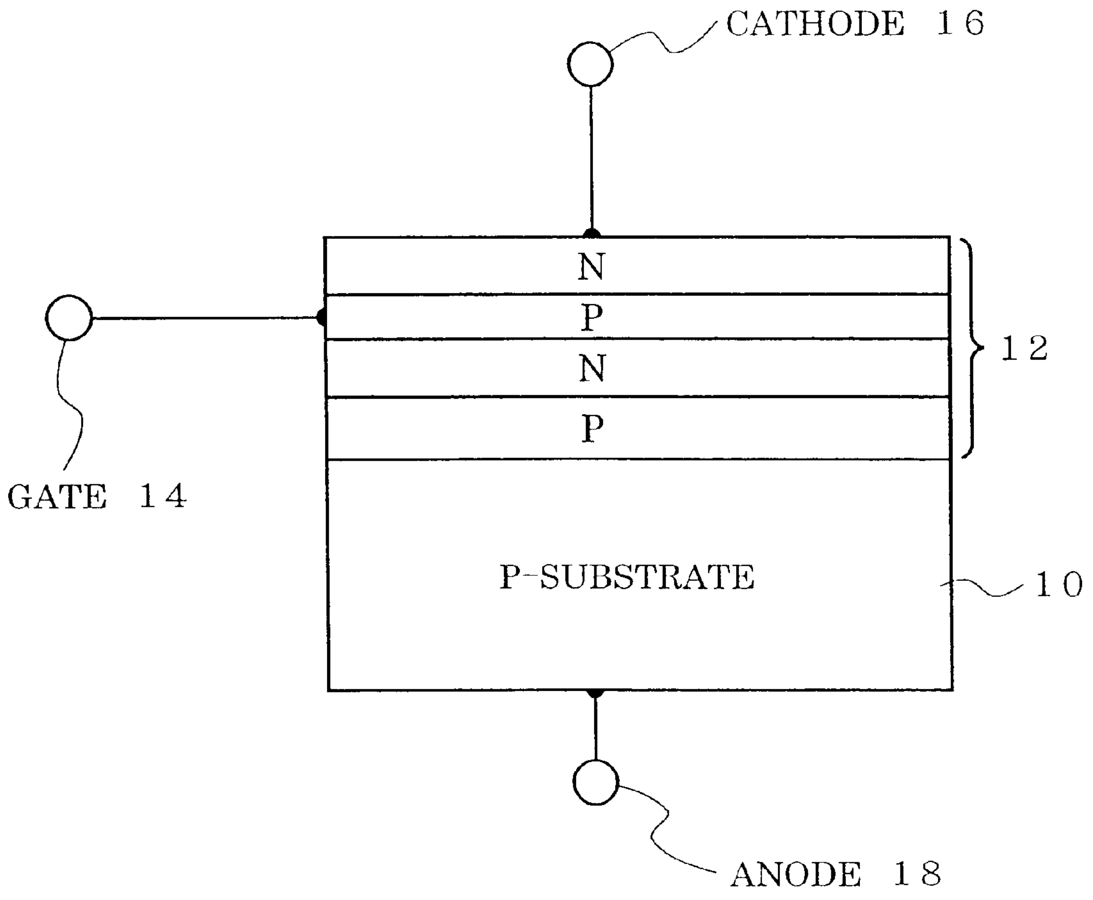
FIG. 1 shows a fundamental structure of a three-terminal light-emitting thyristor.

A self-scanning light-emitting element array used in an optical writing head according to the present invention will now be described. The self-scanning light-emitting element array employs a three-terminal light-emitting thyristor. The fundamental structure of the three-terminal light-emitting thyristor is shown in FIG. 1, in which a PNPN-structure 12 is formed on a P-type GaAs substrate 10, as an example. A gate 14 of the thyristor serves to control a turn on-voltage. The turn on-voltage supplied to a cathode 16 is equal to the gate voltage+a diffusion potential of PN junction. The gate voltage becomes substantially equal to the anode voltage after the thyristor is turned on. Therefore, if the anode 18 is grounded, then the gate voltage becomes 0 volts.

Figure 2:
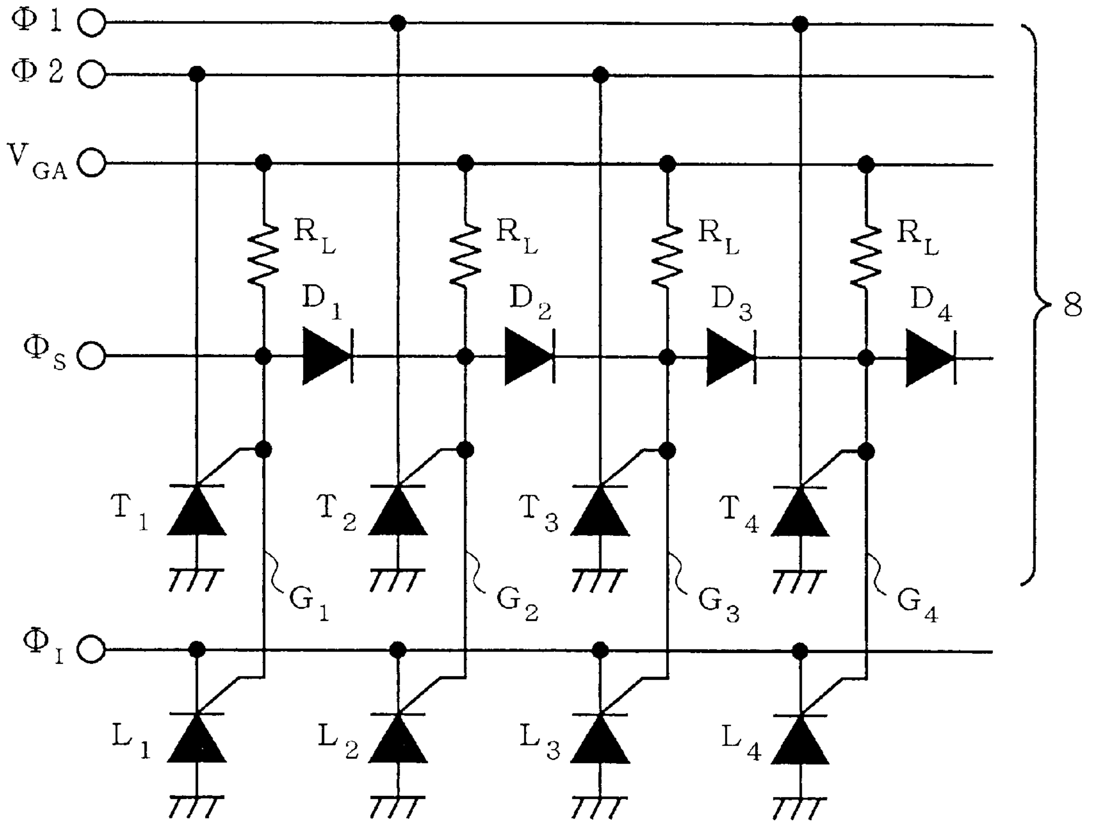
FIG. 2 shows an equivalent circuit diagram of a fundamental structure of a self-scanning light-emitting array.

Referring to FIG. 2, there is shown an equivalent circuit diagram of a fundamental structure of the self-scanning light-emitting element array described the Japanese Patent Publication No.2-263668. This self-scanning light-emitting element array comprises an array of transfer elements $T_1$, $T_2$, $T_3$, . . . and an array of writable light-emitting elements $L_1$, $L_2$, $L_3$, . . . , these transfer and light-emitting elements consisting of three-terminal light-emitting thyristors. The gate electrodes of neighboring transfer elements are connected to each other via diodes $D_1$, $D_2$, $D_3$, . . . , respectively.

Clock pulses Φ1 and Φ2 are alternately applied to the cathode electrodes of the transfer elements. $V_{GA}$ is a power supply (normally −5 volts), and is connected to all the gate electrodes $G_1$, $G_2$, $G_3$, . . . of the transfer elements via a load resistor $R_L$, respectively. A shift register is consisted by the transfer elements $T_1$, $T_2$, $T_3$, . . . , the diodes $D_1$, $D_2$, $D_3$, . . . , and the load resistors $R_L$. Respective gate electrodes are correspondingly connected to the gate electrodes of the light-emitting elements. A start pulse $\Phi_S$ is applied to the gate electrode of the first transfer element $T_1$, and a write signal $\Phi_I$ is applied to all the cathode electrodes of the light-emitting elements.

The operation of this self-scanning light-emitting array will now be described briefly. Assuming that the transfer element $T_2$ is in on-state, the voltage of the gate electrode $G_2$ is increased more than the power supply voltage $V_{GA}$ (−5 volts) and is driven to about 0 volts. Therefore, if the voltage of the write signal $\Phi_I$ is lower than the diffusion voltage (about 1 volt) of PN junction, the light-emitting element $L_2$ may be turned into an on-state (i.e., a light-emitting state).

On the other hand, the voltage of the gate electrode $G_1$ is about −5 volts, and the voltage of the gate electrode $G_3$ is about −1 volt. Consequently, the write voltage of the light-emitting element $L_1$ is about −6 volts, and the write voltage of the light-emitting element $L_3$ is about −2 volts. It is recognized from this that the voltage of the write signal $\Phi_I$ which can write into only the light-emitting element $L_2$ is in a range of about −1—2 volts. When the light-emitting element $L_2$ is turned on, i.e., in the light-emitting state, the voltage of the write signal $\Phi_I$ is cramped to −1 volt. Therefore, there is no possibility that another light-emitting element is selected and turned on.

The amount of light emitted from the element is determined by a current due to the write signal $\Phi_I$. Accordingly, the light-emitting elements may emit light at any desired amount of light. In order to transfer on-state to the next element, it is necessary to turn off the element in on-state by temporarily dropping the voltage of the write signal $\Phi_I$ down to zero volts.

When the self-scanning light-emitting element array described above is applied to an optical printer and the like, a predetermined number of transfer elements and light-emitting elements are integrated into one chip to fabricate a self-scanning light-emitting element array chip. A plurality of the self-scanning light-emitting element array chips are arrayed in one line to make a self-scanning light-emitting element array of a predetermined size.

Now, embodiments of an optical writing head using a self-scanning light-emitting element array will be described accompanying with the drawings.

Embodiment 1

Figure 3:
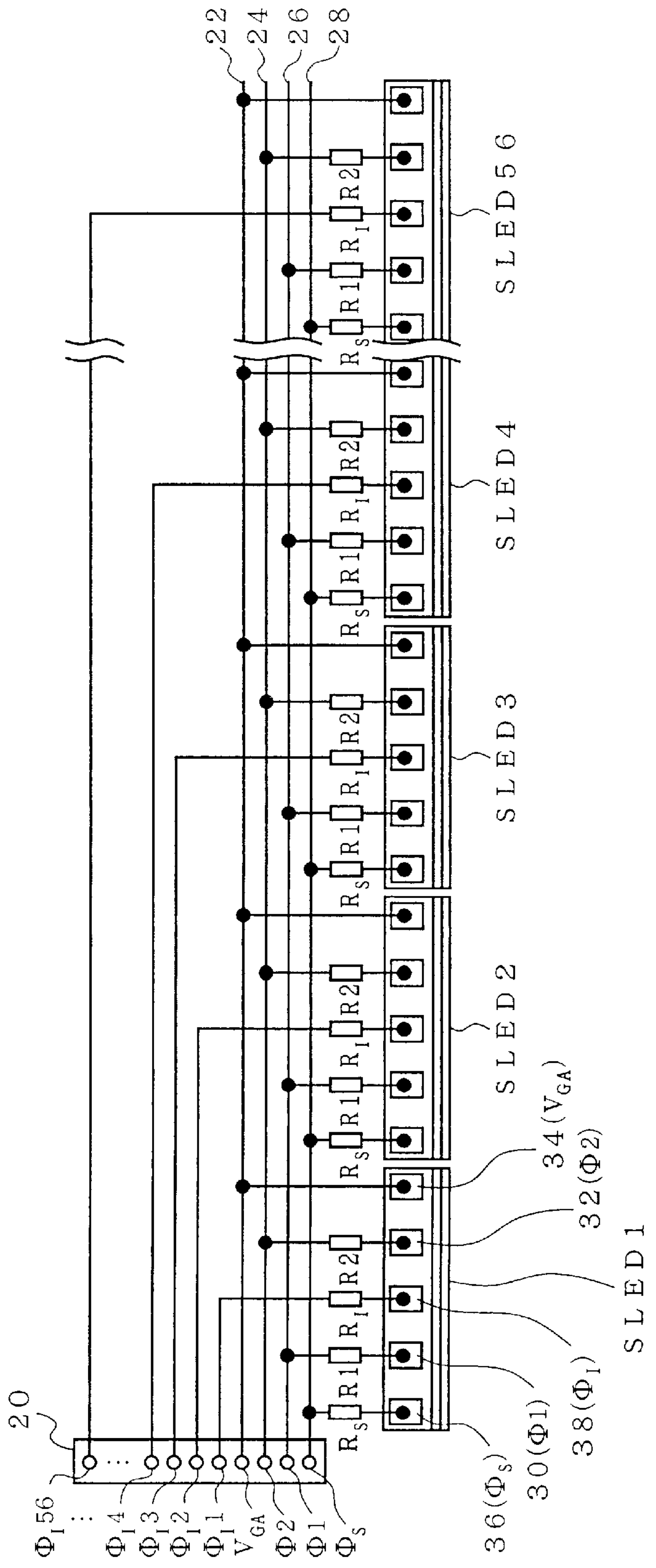
FIG. 3 shows an optical writing head according to an embodiment 1.

Referring to FIG. 3, an optical writing head for A3 size paper is structured by arranging 56 self-scanning light-emitting element array (abbreviated as SLED) chips, each thereof is 600 dpi/128 light-emitting points/one point light-emitting type (only one light-emitting element is lighted up per chip at one time). One point light-emitting type SLED chip used in this embodiment is shown in FIGS. 4A and 4B.

Figure 4A:
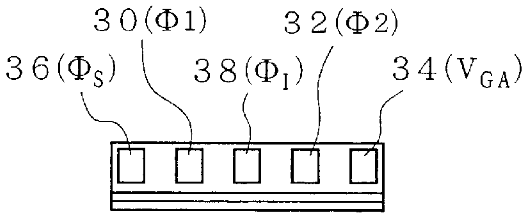
FIGS. 4A, 4B show bonding pads and an equivalent circuit diagram of a SLED chip used in the embodiment 1.
Figure 4B:
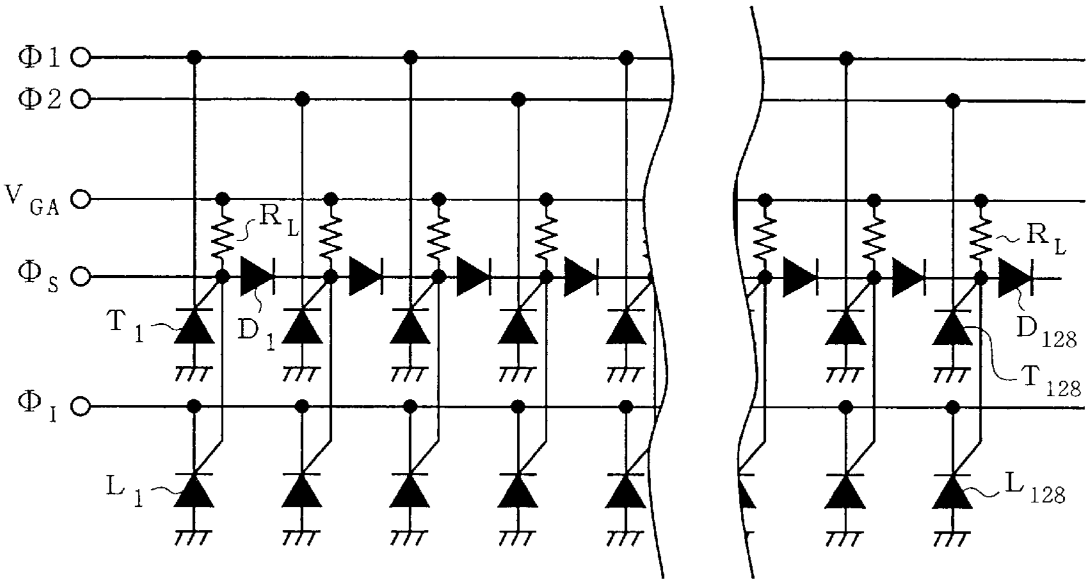

The SLED chip shown in FIG. 4B comprises 128 transfer elements $T_1$–$T_{128}$ and 128 writable light-emitting elements. The part of a shift register uses diodes for connecting gate electrodes of adjacent transfer elements. $V_{GA}$ denotes power supply which is connected to all the gate electrode of the transfer elements via respective load resistors $R_L$. Each gate electrode of the transfer elements is also connected to a gate electrode of corresponding light-emitting element. A start pulse $\Phi_S$ is applied to the gate electrode of the transfer element $T_1$, transfer clock pulse Φ1 and Φ2 are alternately applied to the cathode electrodes of the transfer elements, and a write signal $\Phi_I$ is applied to all the cathode electrodes of the light-emitting elements.

The SLED chip comprises bonding pads 30, 32, 34, 36, 38 for signals Φ1, Φ2, $V_{GA}$, $\Phi_S$, $\Phi_I$ as shown in FIG. 4A.

Returning to FIG. 3, a signal wiring to a self-scanning light-emitting element array will be described, which is structured by arranging 56 SLEDs (SLED1–SLED56) each having bonding pads 30, 32, 34, 36, 38 described above. Bus lines 22, 24, 26, 28 are elongated respectively from $V_{GA}$, Φ2, Φ1, $\Phi_S$ terminals of a connector 20. The Φ1 bonding pad 30 of each SLED chip is connected to the Φ1 bus line 26 via a current limiting resistor R1 provided outside the chips, and the Φ2 bonding pad 32 is connected to the Φ2 bus line 24 via a current limiting resistor R2 provided outside the chips. Also, $\Phi_S$ bonding pad 36 is connected to the $\Phi_S$ bus line 28 via a current limiting resistor $R_S$ provided outside the chip, and the $V_{GA}$ bonding pad 34 is directly connected to the $V_{GA}$ bus line 22. Each $\Phi_I$ bonding pad of the SLED chips is connected to corresponding one of $\Phi_I$(1)–$\Phi_I$(56) terminals of the connector 20, via a current limiting resistor $R_I$ provided outside the chips through corresponding bus lines for write signals $\Phi_I$(1)–$\Phi_I$(56).

In this optical writing head, respective SLED chips starts their transfer operation at the same time since the same start pulse $\Phi_S$ is given to all the SLED chips. The amount of light emitted from one light-emitting element of each SLED chip is determined by the signals $\Phi_I$(1)–$\Phi_I$(56) applied thereto, respectively.

According to the optical writing head having above-described structure, the total number of bus lines derived from all the chips is 61, i.e., bus lines for $\Phi_S$, Φ1, Φ2, $V_{GA}$, $\Phi_I$(1)–$\Phi_I$(56) in addition to a bus line for grounding (not shown in the figure). It is recognized that the number of lines is extremely less as compared with that of lines of a conventional optical writing head using LED array. Also, the total number of used resistor R1, R2, $R_S$, $R_I$ is 224 (=56×4).

In the embodiment described above, while two-phase driving SLED chip which is driven by transfer clock pulses Φ1 and Φ2, a SLED chip which is driven by more than two phase clock pulses may be used.

Embodiment 2a

This embodiment is directed to an optical writing head having current limiting resistors R1, R2, $R_S$, $R_I$ provide within respective SLED chips, while these resistors are provided outside SLED chips in the optical writing head in FIG. 3

Figure 5:
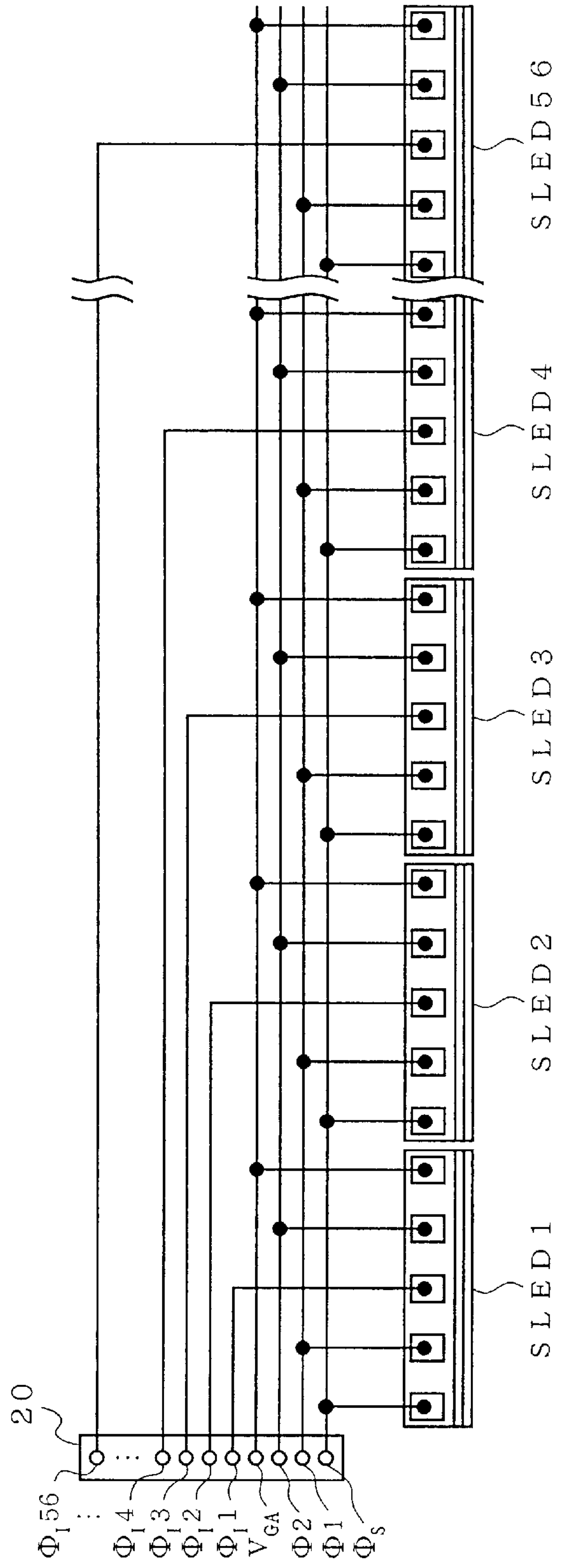
Figure 6A:
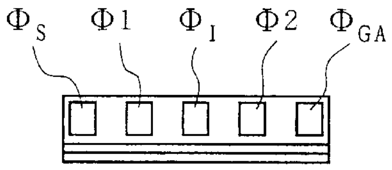
Figure 6B:
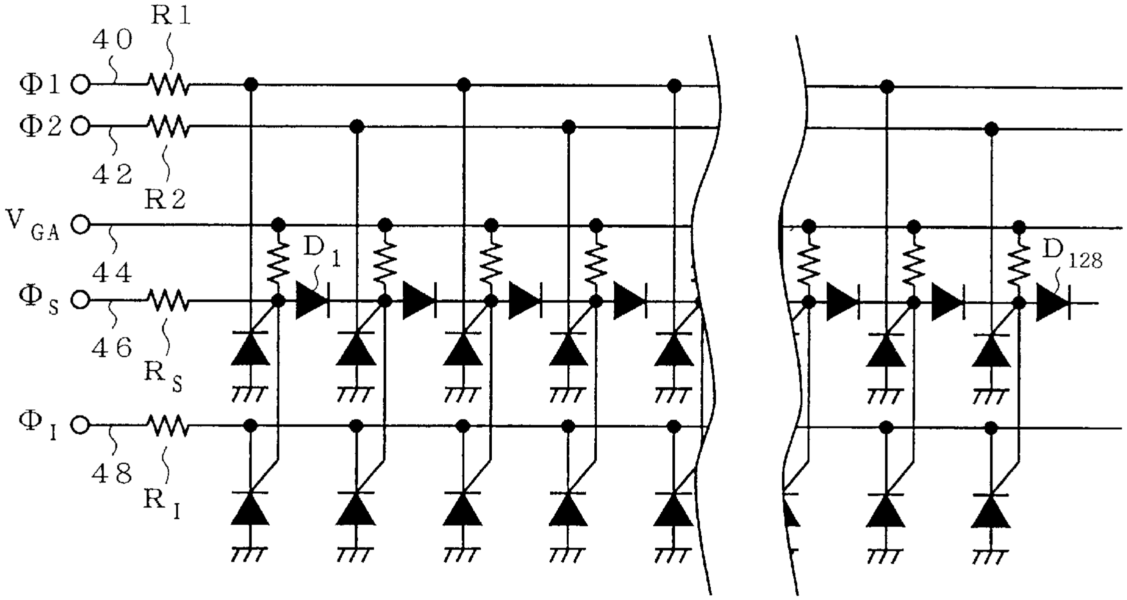

Referring to FIG. 5, 56 SLED chips are arranged to form an optical writing head for A3 size paper, each SLED chip being 600 dpi/128 light-emitting points/one point light-emitting type SLED chip and including the resistors therein. The SLED chip used in this embodiment is shown in FIGS. 6A and 6B. The SLED chip includes the current limiting resistors R1, R2, $R_S$, $R_I$ as shown in FIG. 6B. These resistors are inserted in Φ1 line 40, Φ2 line 42, $\Phi_S$ line 46, $\Phi_I$ line 48, respectively. The number of bonding pads of one chip is equal to that of the embodiment 1.

As is apparent from comparing the head of FIG. 5 with that of FIG. 3, an optical writing head consisting of only SLED chips as electrical components may be implemented, resulting in a head having further slender width.

Embodiment 2b

Figure 7A:
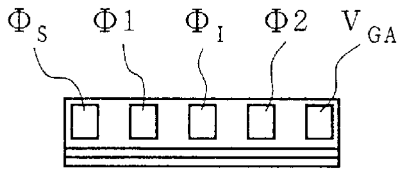
FIGS. 7A, 7B show bonding pads and an equivalent circuit diagram of a SLED chip used in the embodiment 2b.
Figure 7B:
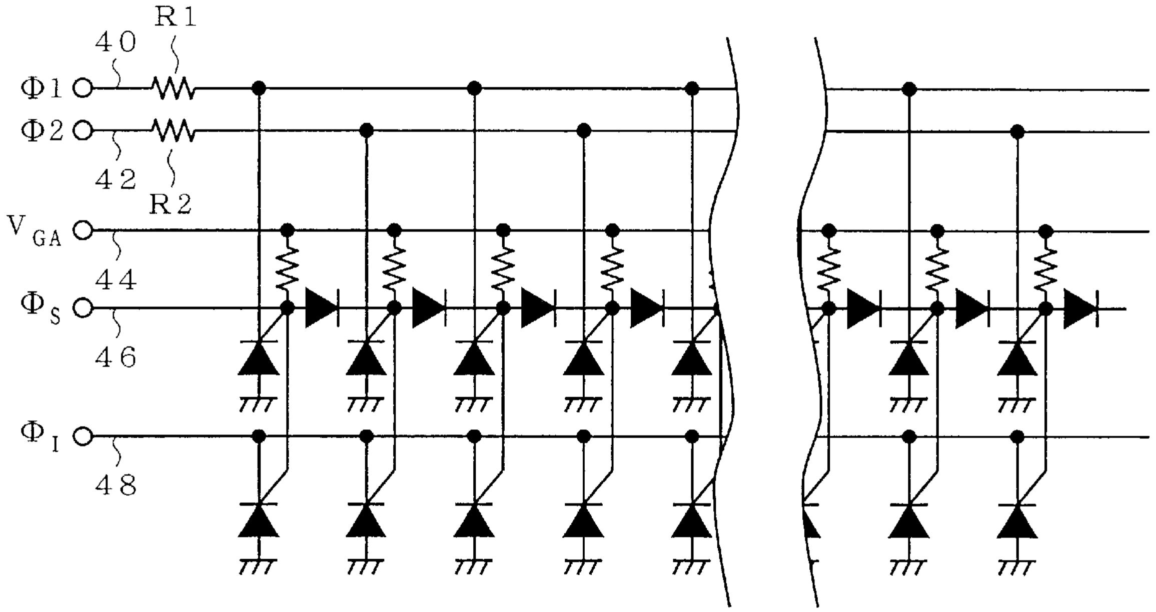

This embodiment uses SLED chips each including current limiting resistors R1 and R2 only in place of SLED chips of the embodiment 2a. The SLED chip used in this embodiment is shown in FIG. 7. The SLED chip comprises the resistors R1 and R2 inserted in the Φ1 line 40 and Φ2 line 42, and no resistors are inserted in the $\Phi_S$ line 46 and $\Phi_I$ line 48. The $\Phi_I$(1)–$\Phi_I$(56) terminals of the connector 20 are driven by current sources, as no resistor is inserted in the $\Phi_I$ line 48. The voltage between anode and cathode of a thyristor in on-state is held equal to the foward voltage of PN junction. Utilizing this characteristic, a current source comprising the combination of a voltage source and resistor may be used.

In this manner, no resistor is inserted in $\Phi_I$ line 48 in this embodiment, there is no heat generation by the resistor $R_I$ in the case of LED chip in FIG. 6. As a result, the temperature increasing in the chip of this embodiment may be prevented compared with the chip of FIG. 6.

Embodiment 2c

Figure 8:
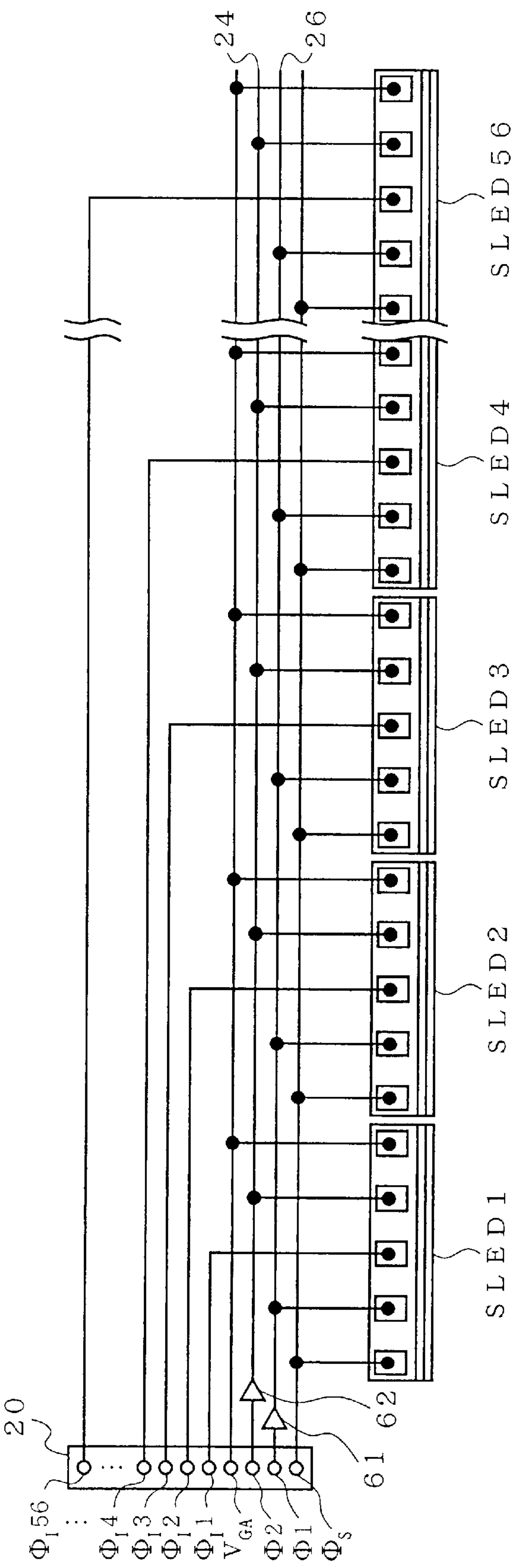
FIG. 8 shows an optical writing head according to an embodiment 2c.

Referring to FIG. 8, there is shown an optical writing head of this embodiment. In this head, buffer ICs 61 and 62 are inserted in Φ1 and Φ2 bus lines, respectively, of the optical writing head in the embodiment 2b.

The reason why the buffer ICs are inserted will now be explained. If a current of about 5 mA flows through Φ1 bus line 26 and Φ2 bus line 24 respectively in each SLED chip, then the total current flown through Φ1 bus line 26 and Φ2 bus line 24 respectively amounts to 300 mA with respect to 60 SLED chips. When a large current is shut down, an undesirable radiation is generated to possibly cause an electromagnetic interference. Inserting the buffer IC in the bus line may prevent the undesirable radiation due to the interruption of a large current from generating.

As buffer ICs are inserted in the bus lines, a higher or lower voltage than the threshold voltage may be applied to the Φ1 and Φ2 terminals of the connector 20. It is generally difficult for the SLED chip having transfer elements connected by a diode therebetween to operate by a 3V power supply. However, by inserting buffer ICs as described above, it may be possible to operate the SLED chip by 3V system signals, though a 5V power supply is required. As a power supply voltage is decreased in this manner, the consumption of power supply may be reduced.

Embodiment 3

This embodiment is directed to an optical writing head for A3 size paper structured by arranging 56 SLED chips, each thereof is 600 dpi/128 light-emitting points/two points light-emitting type (two light-emitting elements are lighted up per chip at the same time), which includes resistors therein.

Figure 9:
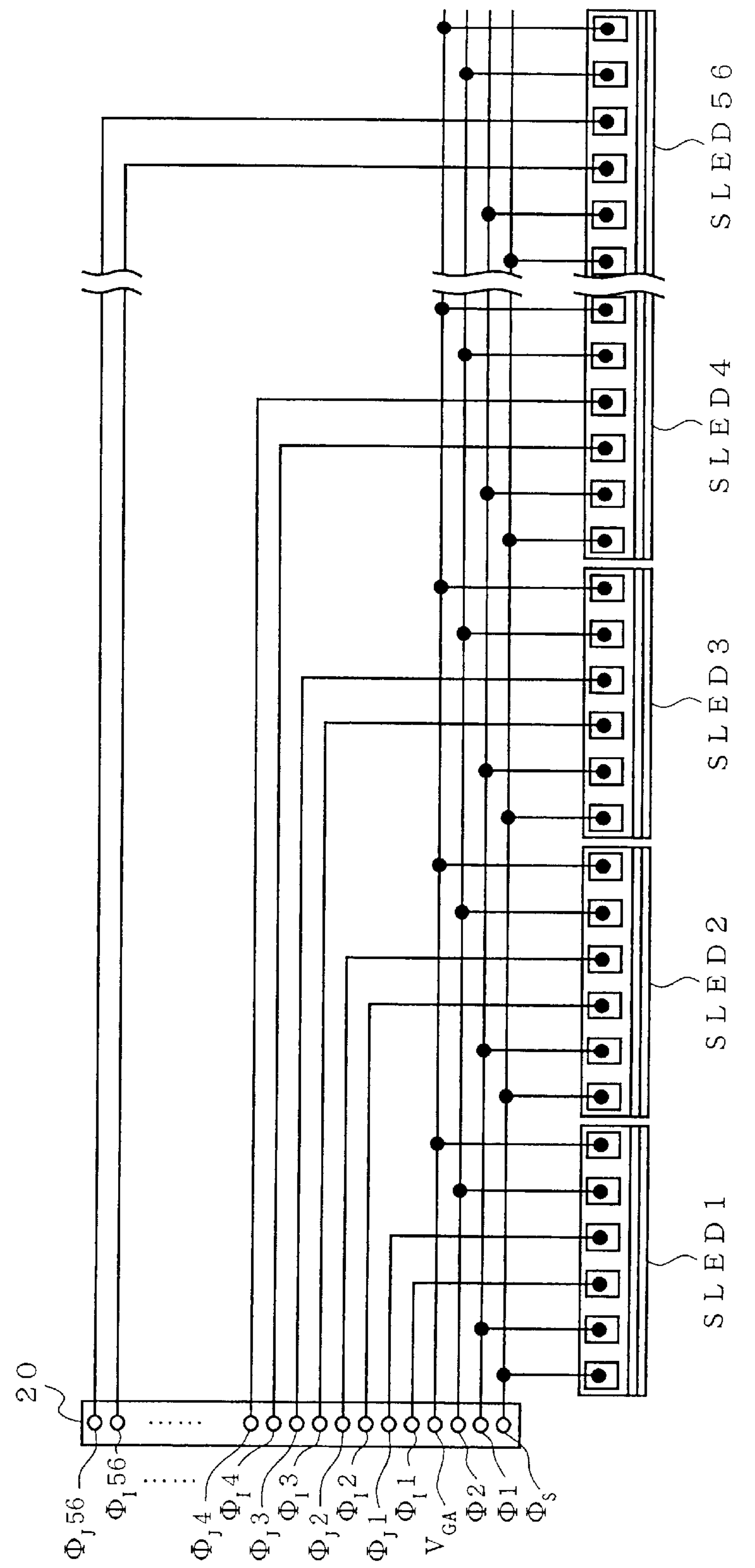
FIG. 9 shows an optical writing head according to an embodiment 3.
Figure 10A:
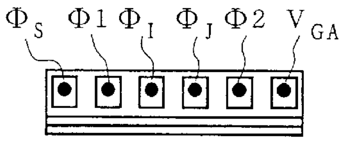
FIGS. 10A, 10B show bonding pads and an equivalent circuit diagram of a SLED chip used in the embodiment 3.
Figure 10B:
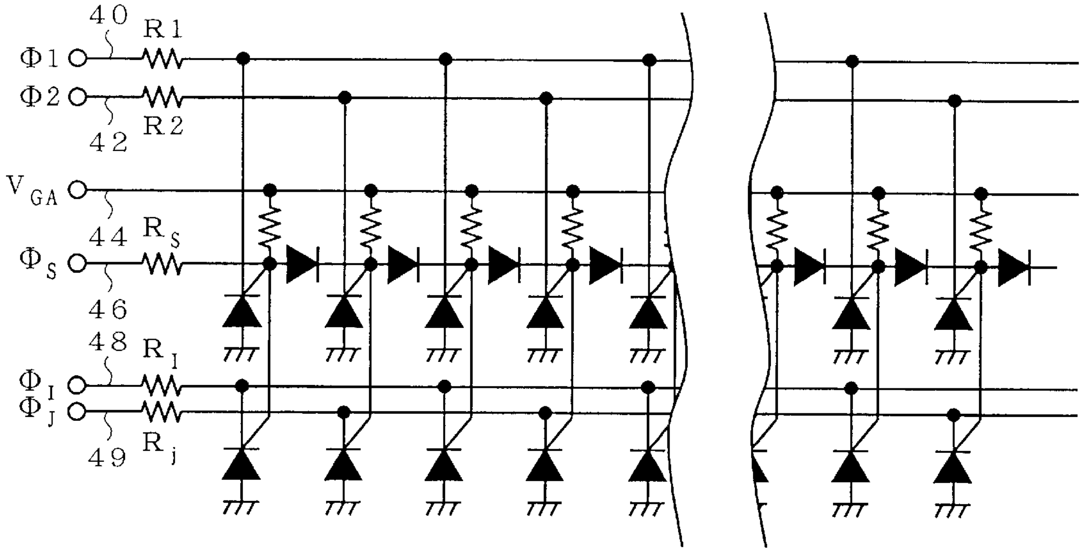

FIG. 9 shows the structure of the optical writing head, and FIGS. 10A and 10B show a SLED chip used in this embodiment.

The SLED chip shown in FIGS. 10A and 10B further includes a writing signal $\Phi_J$ in addition to the writing signals $\Phi_I$ in the SLED chip in FIG. 6. A current limiting resistor $R_J$ is inserted in $\Phi_J$ line 49. The writing signals $\Phi_I$ and $\Phi_J$ are alternately applied to the light-emitting elements, thereby allowing two light-emitting element in one chip to light up at the same time. As a result, a duty ratio of the writing signal becomes large to increase an effective amount of emitted light.

According to the head of this embodiment as shown in FIG. 9, two writing signal bus lines, $\Phi_I$(1)–$\Phi_I$(56) and $\Phi_J$(1)–$\Phi_J$(56) bus lines are provided with every chip, so that 56 bus lines are increased as compared with the embodiment 1 and the total number of bus lines derived from the chips is 117.

It is also possible in this embodiment to use more than two phase clock lines and/or more than two write signal lines in a chip.

Embodiment 4

This embodiment is directed to an optical writing head for A3 size paper structured by arranging 56 SLED chips, each thereof is 600 dpi/128 light-emitting points/plural points light-emitting type (a plurality of light-emitting elements are lighted up per chip at the same time).

Figure 11:
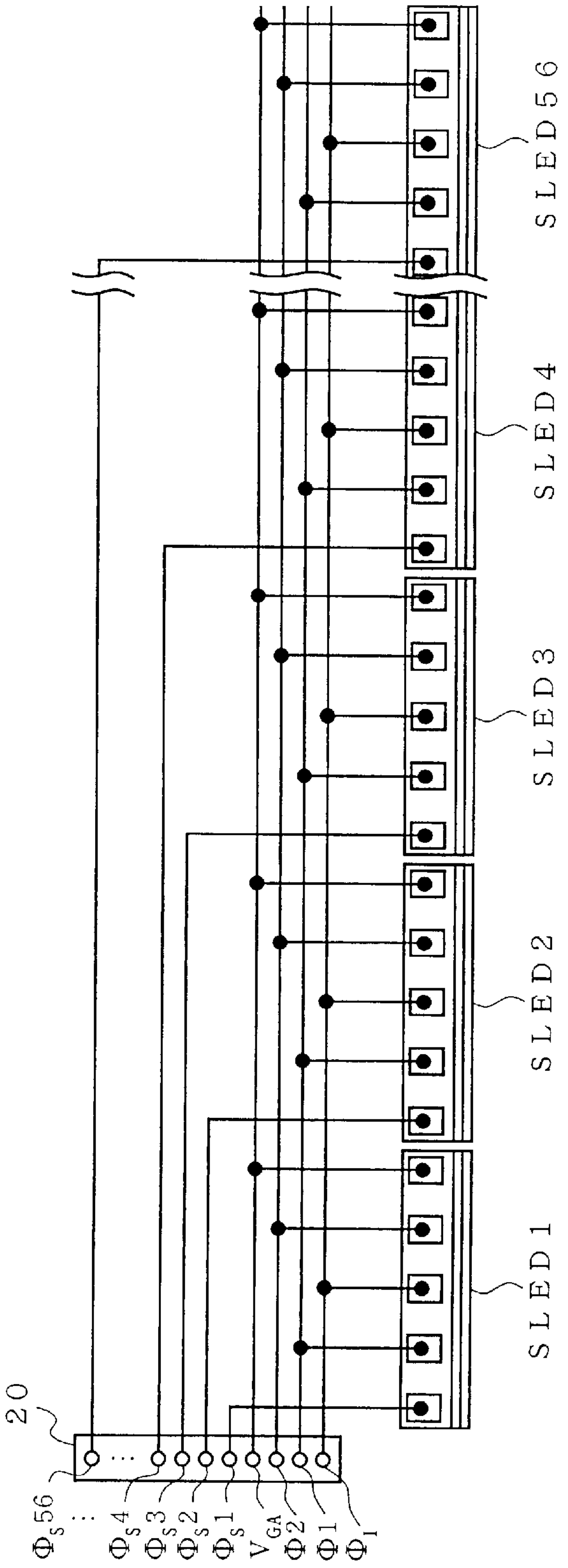
FIG. 11 shows an optical writing head according to an embodiment 4.
Figure 12:
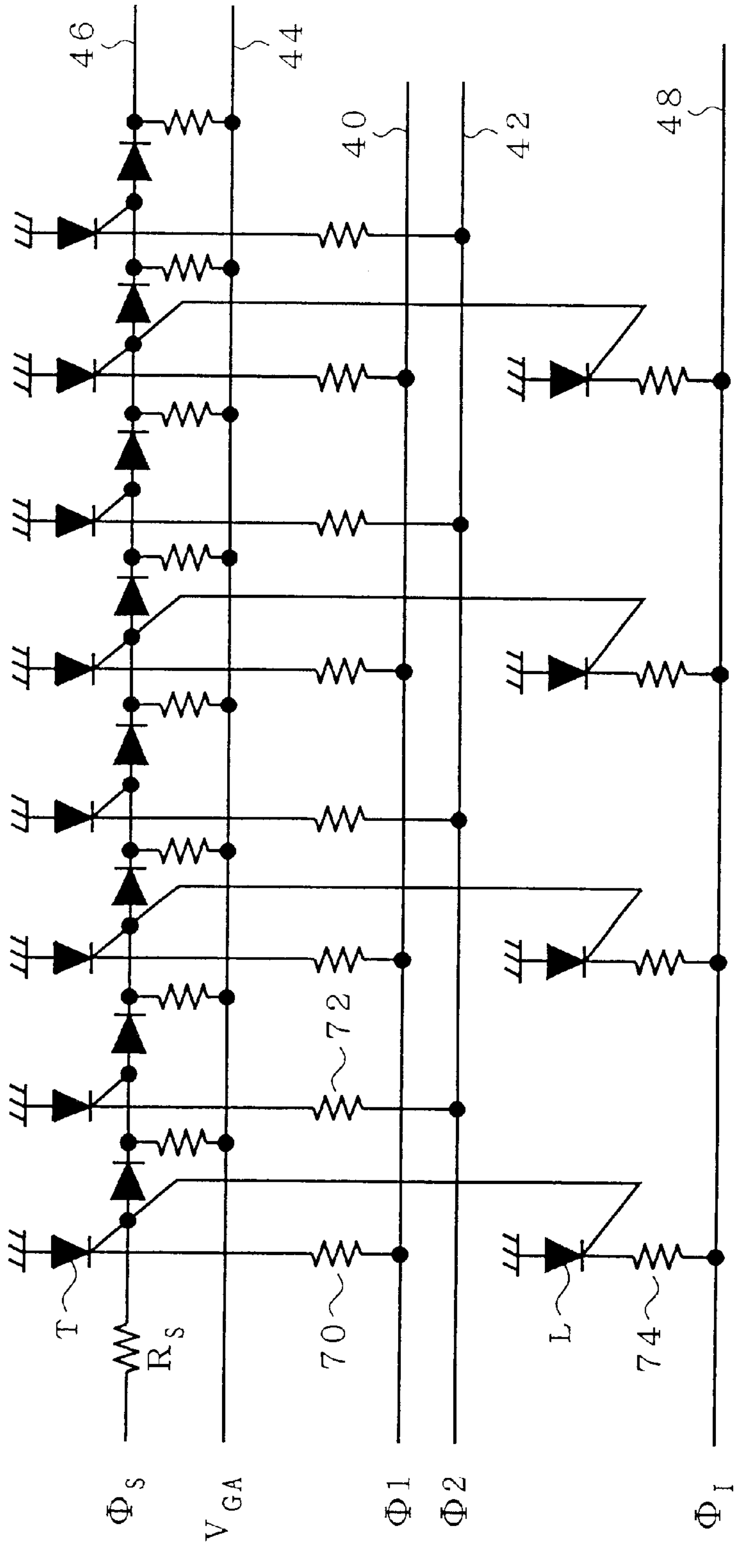
FIG. 12 shows an equivalent circuit diagram of a SLED chip used in the embodiment 4.

FIG. 11 shows the structure of the optical writing head, and FIG. 12 shows a SLED chip used in this embodiment. In the SLED chip of plural points light-emitting type, each cathode electrode of transfer elements T is alternately connected to the Φ1 and Φ2 lines 40, 42 via current limiting resistors 71, 72, respectively. Each cathode electrode of the light-emitting elements L is connected to the $\Phi_I$ line 48 via a current limiting resistor 74. These resistors 71, 72, 73 are integrated in the chip. Each gate electrode of light-emitting elements L is connected to the gate electrode of the corresponding transfer elements T to which the clock pulse Φ1 is applied.

In the optical writing head as shown in FIG. 11 in which above-described SLED chips are arranged, 56 start pulses $\Phi_S$(1)–$\Phi_S$(56) are prepared and applied to each SLED chip (SLED1–SLED 56), respectively. Data for designating a plurality of transfer elements desired to be turned on is previously written to the shift register every chip by start pulse so as to light up a plurality of light-emitting elements by the writing pulse $\Phi_I$ at the same time. According to the plural points light-emitting type SLED chip, all the resistors are included in the chip, so that the optical writing head may be implemented only by SLED chips as electrical parts.

In the embodiment described above, more than two phase clock pulses may be used, and also more than two $\Phi_S$ lines may be provided.

Embodiment 5

Figure 13:
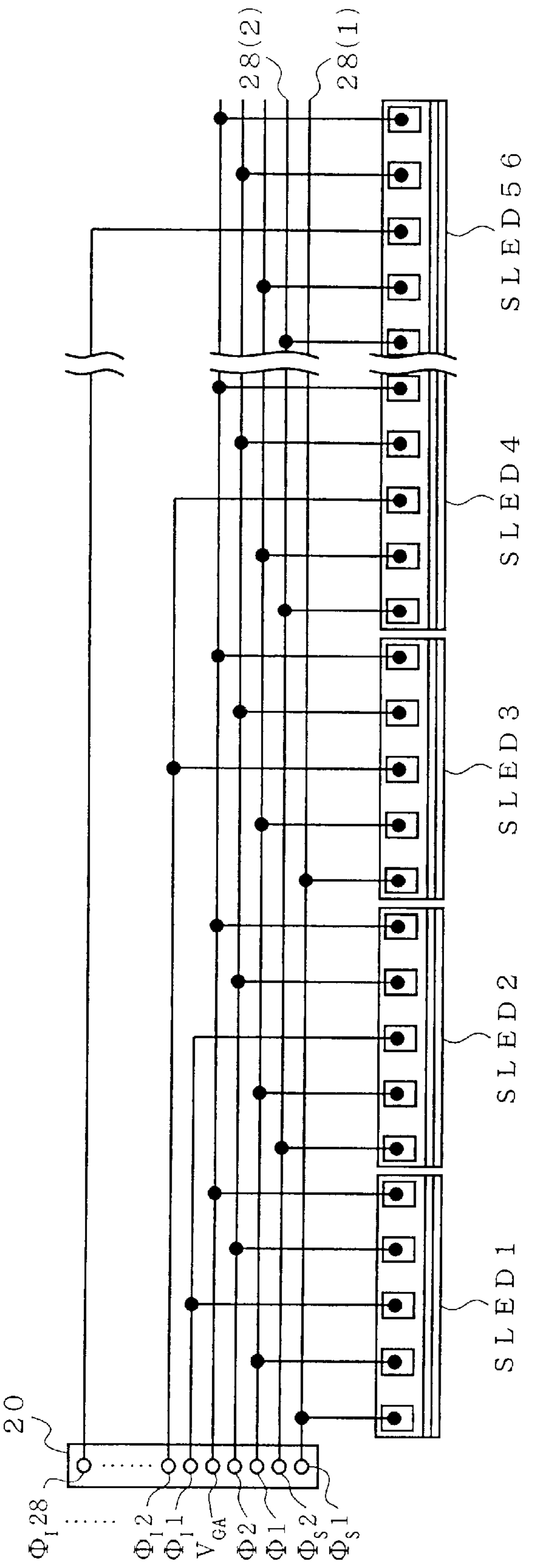
FIG. 13 shows an optical writing head according to an embodiment 5.

Referring to FIG. 13, there is shown an optical writing head according to this embodiment. In the embodiment, two start pulse bus lines, i.e., $\Phi_S$(1) bus line 28(1) and $\Phi_S$(2) bus line 28(2) are provided as compared with the head of the embodiment 2a as shown in FIG. 5. The $\Phi_S$(1) bus line 28(1) is connected to the SLED 1, SLED3, SLED5, . . . , and $\Phi_S$(2) bus line 28(2) is connected to the SLED2, SLED4, . . . , as shown in FIG. 13.

Furthermore, the number of writing signal $\Phi_I$ is decreased by half, i.e., $\Phi_I$(1)–$\Phi_I$(28) as compared with the head as shown in FIG. 5 to apply the same writing signal to every adjacent two SLED chips.

According to this head, the total number of bus lines derived from the chips is 34, i.e., the bus lines for $\Phi_S$(1), $\Phi_S$(2), Φ1, Φ2, $V_{GA}$, $\Phi_I$(1)–$\Phi_I$(28) in addition to a ground bus line (not shown).

Figure 14:
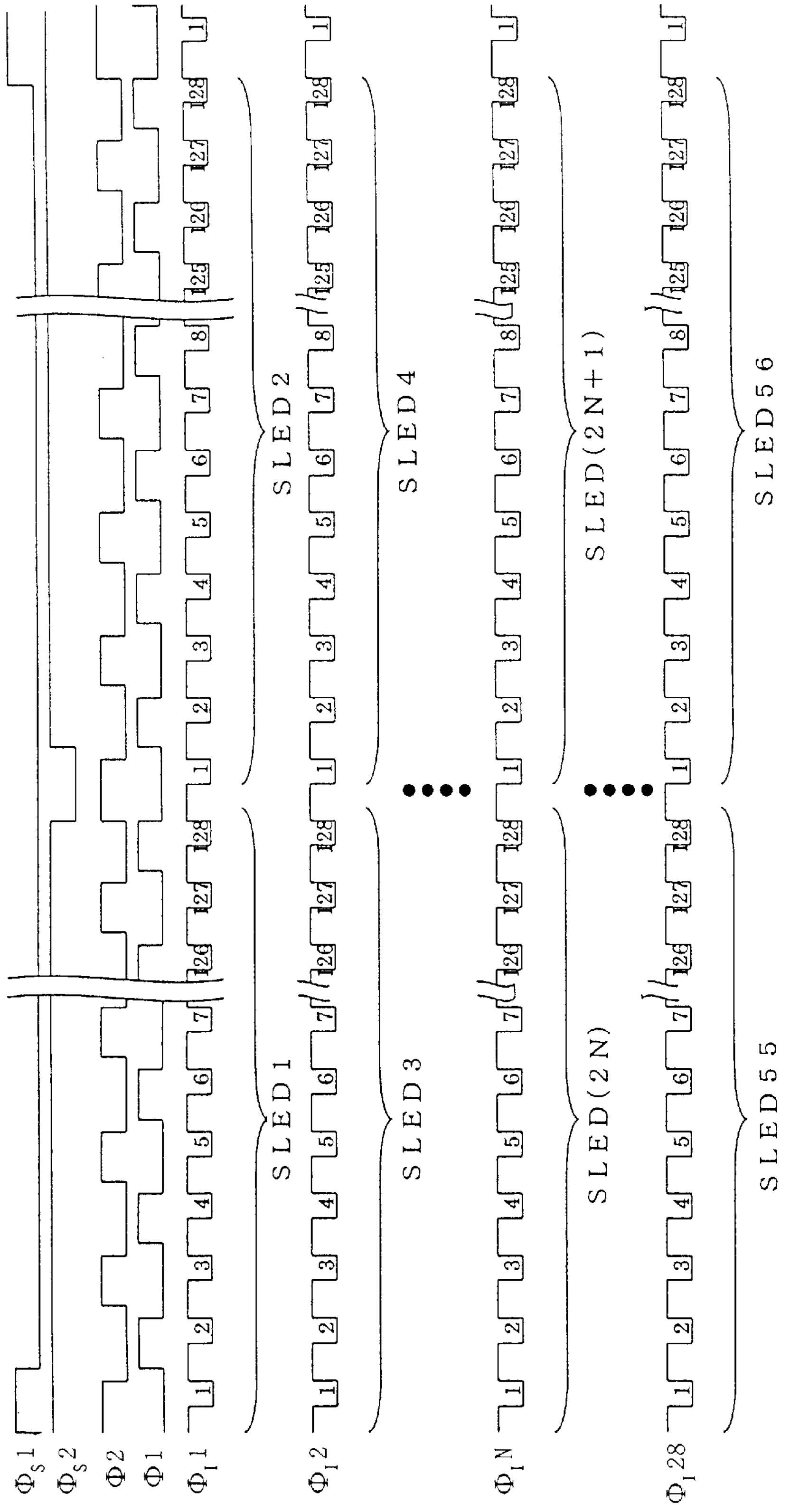
FIG. 14 shows the waveforms of the signals in the optical writing head of FIG. 13.

FIG. 14 shows the waveforms of the signals in the head of FIG. 13. It is recognized from the figure that the start pulse $\Phi_S$(1) is applied to odd numbered SLED chips, the start pulse $\Phi_S$(2) is applied to even numbered SLED chips, and the writing signals $\Phi_I$(1), $\Phi_I$(2), $\Phi_I$(3), . . . are applied to every adjacent two SLED chips, respectively.

In the embodiment descried above, more than two phase clock pulses may be used, and also more than two $\Phi_S$ lines may be provided.

Embodiment 6

Figure 15:
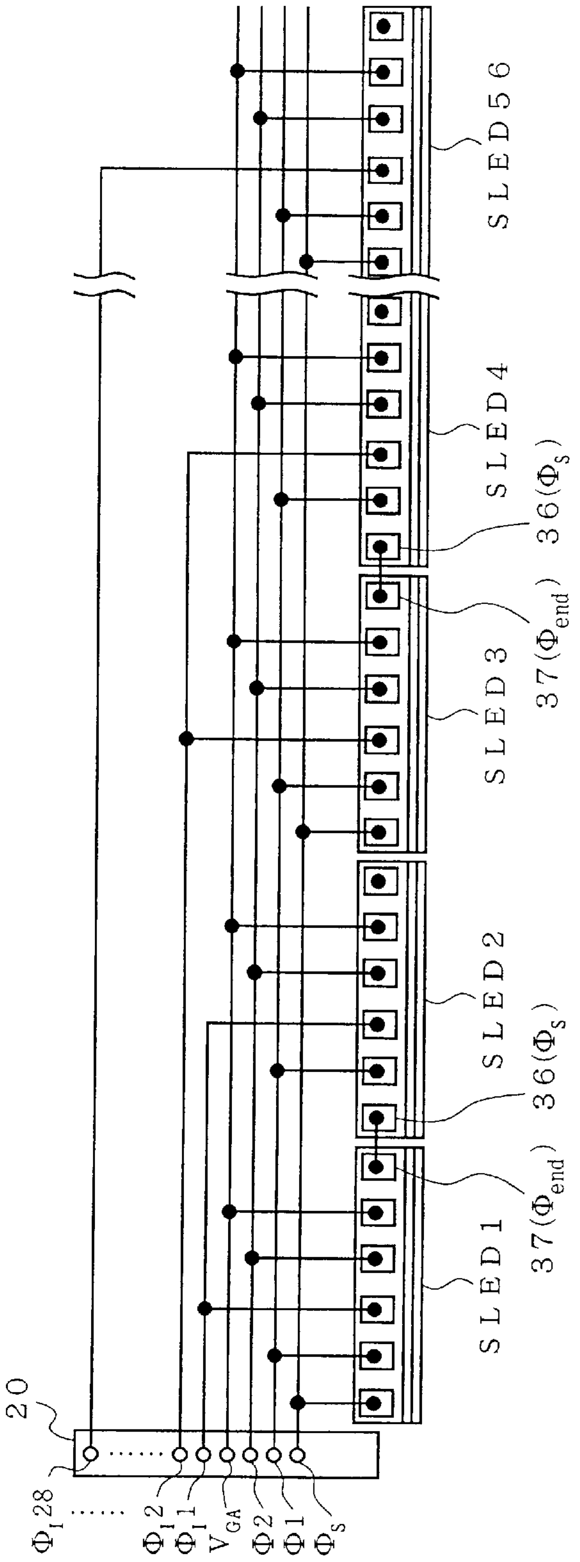
FIG. 15 shows an optical writing head according to an embodiment 6.

Referring to FIG. 15, there is shown an optical writing head according to this embodiment. In the embodiment, a chip is used in which the cathode of the final connecting diode in the SLED chip (as shown in FIG. 5) of the embodiment 2a is derived as an end bonding pad ($\Phi_{end}$) 37. The $\Phi_{end}$ bonding pad 37 of (2N−1)th SLED chip is connected to the $\Phi_S$ bonding pad 36 of 2Nth SLED chip. The start pulse $\Phi_S$ is applied to (2N−1)th SLED chip.

In this manner, two SLED chips may be treated like one chip, so that the total number of bus lines derived from the chips is 33, i.e., the bus lines for $\Phi_S$, $\Phi$1, $\Phi$2, $V_{GA}$, $\Phi_I$(1)–$\Phi_I$(28) in addition to the ground bus line (not shown).

Figure 16A:
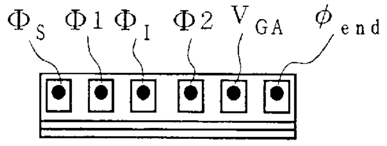
FIGS. 16A, 16B show bonding pads and an equivalent circuit diagram of a SLED chip used in the embodiment 6.
Figure 16B:
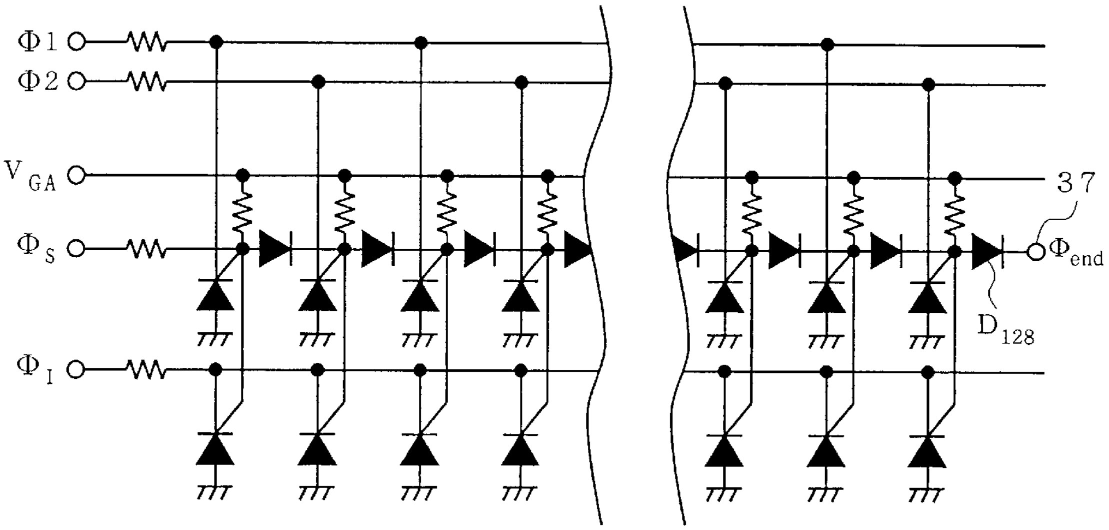

FIGS. 16A and 16B show the bonding pads and circuitry of such SLED chip. It is recognized from FIG. 16B that the cathode of the final connecting diode $D_{128}$ is derived as the $\Phi_{end}$ bonding pad 37.

Figure 17:
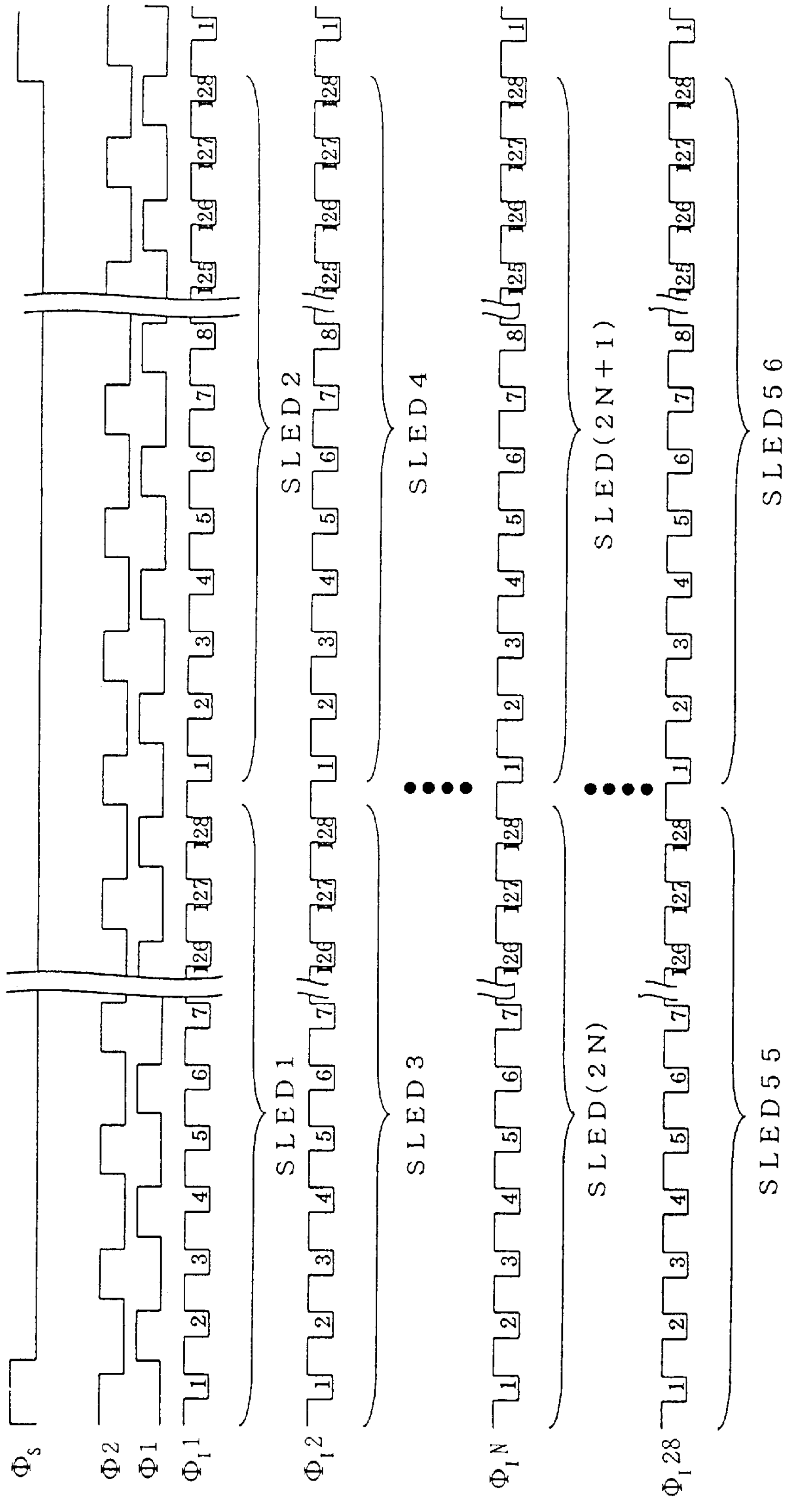
FIG. 17 shows the waveforms of the signals in the optical writing head of FIG. 15.

FIG. 17 shows the waveforms of the signals in the optical writing head. As apparent from comparing with the waveforms in FIG. 14, it is recognized that the light-emitting operation is the same as the embodiment 5.

In the embodiment descried above, more than two phase clock pulses may be used, and the $\Phi_{end}$ bonding pad 37 may be connected to the $\Phi_S$ bonding pad 36 for more than two chips as one group.

Embodiment 7

Figure 18:
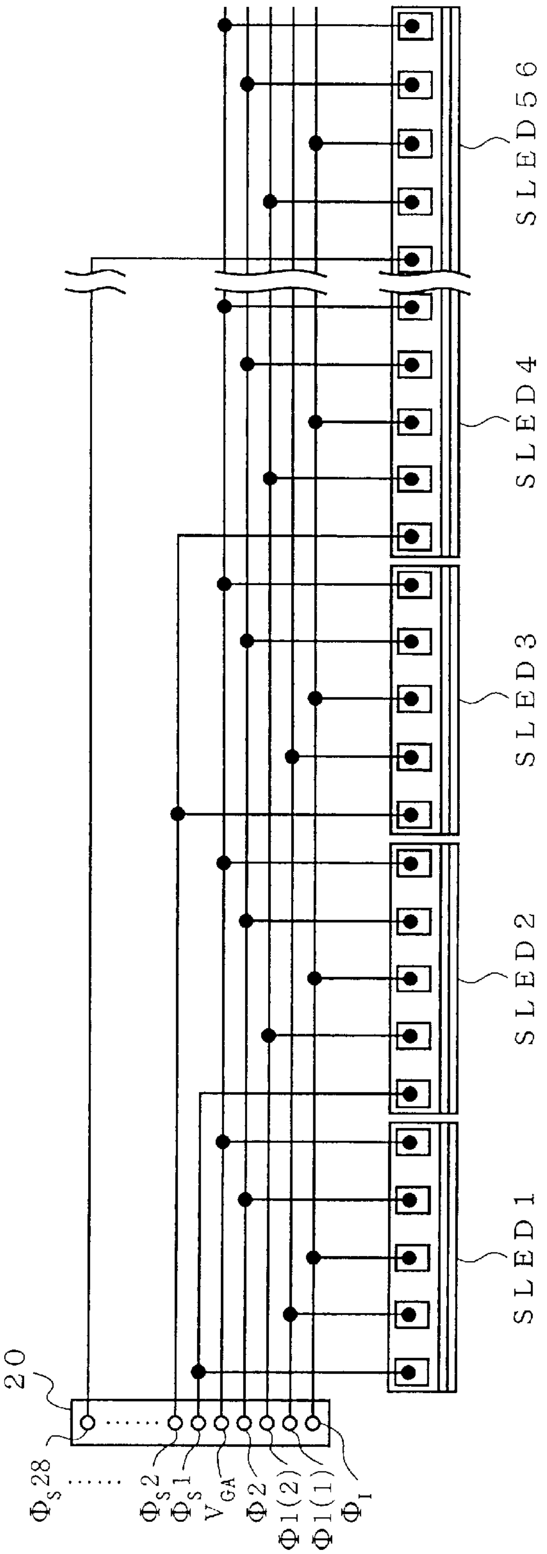
FIG. 18 shows an optical writing head according to an embodiment 7.

It is possible to decrease the number of start pulse bus lines (or data input lines) to 1/L by increasing the number of $\Phi$1 bus lines to L in the embodiment 4 of FIG. 11. FIG. 18 shows the optical writing head according to this embodiment in which L is equal to 2. A $\Phi$1 bus line is increased to 2 lines, i.e., $\Phi$1(1) bus line and $\Phi$1(2) bus line, and start pulse bus lines is decreased to 28 lines, i.e. $\Phi_S$(1) bus line to $\Phi_S$(28) bus line. In this case, the total number of bus lines derived from the SLED chips is 34, i.e., bus lines for $\Phi$1(1), $\Phi$1(2), $\Phi$2, $V_{GA}$, $\Phi_I$, $\Phi_S$(1)–$\Phi_S$(28) in addition to a ground line (not shown).

In the embodiment described above, more than two phase clock pulses may be used, and also more than two $\Phi$1 bus lines may be provided.

According to this optical writing head, the data designating the light-emitting elements to be lighted up at the same time is previously written into the shift register, and then the written light-emitting elements are lighted up by the writing signal $\Phi_I$.

Industrial Applicability

According to the present invention, an optical writing head in which the number of bus lines to be derived from the SLED chips may be decreased by using a self-scanning light-emitting element array may be provided.

What is claimed is:

1. An optical writing head, comprising:

a plurality of self-scanning light-emitting element array chips, each chip including, a transfer element array having such a structure that a plurality of three-terminal transfer elements each having a control electrode for controlling threshold voltage or current are linearly arranged, the control electrodes of the transfer elements neighbored to each other are connected via an electrically unidirectional element, a power supply line is connected to all the control electrodes via respective load resistors, and n-phase (n is an integer≧2) clock lines are connected to one of two terminals other than the control electrode of each of the transfer elements, repeatedly at intervals of n transfer elements, and a light-emitting element array having such a structure that a plurality of three-terminal light-emitting elements each having a control electrode for controlling threshold voltage or current are linearly arranged, each control electrodes of the light-emitting element array is connected to the control electrodes of the corresponding transfer element, and a line for applying a write signal connected to one of two terminals other than the control electrode of each of the light-emitting elements is provided; and wherein a start pulse bus line is commonly connected to the respective chips, n-phases clock pulse bus lines are commonly connected to the respective chips, and write signal bus lines are separately connected to the respective chips.

2. The optical writing head of claim 1, wherein current limiting resistors to be connected to the start pulse bus line, n-phase clock pulse bus lines, and write signal bus lines are included in the chip.

3. The optical writing head of claim 1, wherein current limiting resistors to be connected to the n-phase clock pulse bus lines are included in the chip.

4. The optical writing head of claim 1, wherein a buffer IC is inserted in each of the n-phase clock pulse bus lines.

5. An optical writing head, comprising:

a plurality of self-scanning light-emitting element array chips, each chip including, a transfer element array having such a structure that a plurality of three-terminal transfer elements each having a control electrode for controlling threshold voltage or current are linearly arranged, the control electrodes of the transfer elements neighbored to each other are connected via an electrically unidirectional element, a power supply line is connected to all the control electrodes via respective load resistors, and n-phase (n is an integer≧2) clock lines are connected to one of two terminals other than the control electrode of each of the transfer elements, repeatedly at intervals of n transfer elements, and a light-emitting element array having such a structure that a plurality of three-terminal light-emitting elements each having a control electrode for controlling threshold voltage or current are linearly arranged, each control electrode of the light-emitting element array is connected to the control electrode of the corresponding transfer element, and a line for applying a write signal connected to one of two terminals other than the control electrode of each of the light-emitting elements is provided; and wherein a start pulse bus line is commonly connected to the respective chips, n-phases clock pulse bus lines are commonly connected to the respective chips, and two write signal bus lines are separately connected to the respective chips, the two write signal bus lines are alternately connected to the light-emitting elements in each chip.

6. An optical writing head, comprising:

a plurality of self-scanning light-emitting element array chips, each chip including, a transfer element array having such a structure that a plurality of three-terminal transfer elements each having a control electrode for controlling threshold voltage or current are linearly arranged, the control electrodes of the transfer elements neighbored to each other are connected via an electrically unidirectional element, a power supply line is connected to all the control electrodes via respective load resistors, and n-phase (n is an integer≧2) clock lines are connected via current limiting resistors to one of two terminals other than the control electrode of each of the transfer elements, repeatedly at intervals of n transfer elements, and a light-emitting element array having such a structure that a plurality of three-terminal light-emitting elements each having a control electrode for controlling threshold voltage or current are linearly arranged, each control electrode of the light-emitting element array is connected to the control electrode of the corresponding transfer element at intervals at n elements, and a line for applying a write signal connected via a current limiting resistor to one of two terminals other than the control electrode of each of the light-emitting elements is provided; and wherein start pulse bus line are separately connected to the respective chips, n-phases clock pulse bus lines are commonly connected to the respective chips, and a write signal bus line is commonly connected to the respective chips.

7. An optical writing head, comprising:

a plurality of self-scanning light-emitting element array chips, each chip including, a transfer element array having such a structure that a plurality of three-terminal transfer elements each having a control electrode for controlling threshold voltage or current are linearly arranged, the control electrodes of the transfer elements neighbored to each other are connected via an electrically unidirectional element, a power supply line is connected to all the control electrodes via respective load resistors, and n-phase (n is an integer≧2) clock lines are connected to one of two terminals other than the control electrode of each of the transfer elements, repeatedly at intervals of n transfer elements, and a light-emitting element array having such a structure that a plurality of three-terminal light-emitting elements each having a control electrode for controlling threshold voltage or current are linearly arranged, each control electrode of the light-emitting element array is connected to the control electrode of the corresponding transfer element, and a line for applying a write signal connected to one of two terminals other than the control electrode of each of the light-emitting elements is provided; and wherein m (m is an integer≧2) start pulse bus line are repeatedly connected to the respective chips, n-phases clock pulse bus lines are commonly connected to the respective chips, write signal bus lines are separately connected to every m chip neighbored to each other, and current limiting resistors to be connected to the start pulse bus line, n-phase clock pulse bus lines, and write signal bus lines are included in the chip.

8. An optical writing head, comprising:

a plurality of self-scanning light-emitting element array chips, each chip including, a transfer element array having such a structure that a plurality of three-terminal transfer elements each having a control electrode for controlling threshold voltage or current are linearly arranged, the control electrodes of the transfer elements neighbored to each other are connected via an electrically unidirectional element, a power supply line is connected to all the control electrodes via respective load resistors, and n-phase (n is an integer≧2) clock lines are connected to one of two terminals other than the control electrode of each of the transfer elements, repeatedly at intervals of n transfer elements, and a light-emitting element array having such a structure that a plurality of three-terminal light-emitting elements each having a control electrode for controlling threshold voltage or current are linearly arranged, each control electrode of the light-emitting element array is connected to the control electrode of the corresponding transfer element, and a line for applying a write signal connected to one of two terminals other than the control electrode of each of the light-emitting elements is provided; and wherein the plurality of chips are divided into groups each thereof including m (m is an integer≧2) chips, an end bonding pad of one chip is connected to the start pulse bonding of next chip in one groups of chip, a start pulse bus line is commonly connected to a first chip of the respective groups, n-phase clock pulse bus lines are commonly connected to the respective chips, and write signal bus lines are separately connected to all the chips of the respective groups.

9. An optical writing head, comprising:

a plurality of self-scanning light-emitting element array chips, each chip including, a transfer element array having such a structure that a plurality of three-terminal transfer elements each having a control electrode for controlling threshold voltage or current are linearly arranged, the control electrodes of the transfer elements neighbored to each other are connected via an electrically unidirectional element, a power supply line is connected to all the control electrodes via respective load resistors, and n-phase (n is an integer≧2) clock lines are connected via current limiting resistors to one of two terminals other than the control electrode of each of the transfer elements, repeatedly at intervals of n transfer elements, and a light-emitting element array having such a structure that a plurality of three-terminal light-emitting elements each having a control electrode for controlling threshold voltage or current are linearly arranged, each control electrode of the light-emitting element array is connected to the control electrode of the corresponding transfer element, and a line for applying a write signal connected via a current limiting resistor to one of two terminals other than the control electrode of each of the light-emitting elements is provided; and wherein start pulse bus lines are separately connected to every m (m is an integer≧2) chips neighbored to each other, one-phase m clock pulse bus lines are repeatedly connected to the m chips neighbored to each other, another-phase clock pulse bus lines are commonly connected to the respective chips, and a write signal bus line is commonly connected to the respective chips.

* * * * *

UNITED STATES PATENT AND TRADEMARK OFFICE

CERTIFICATE OF CORRECTION

PATENT NO. : 6,747,940 B2
DATED : June 8, 2004
INVENTOR(S) : Seiji Ohno

It is certified that error appears in the above-identified patent and that said Letters Patent is hereby corrected as shown below:

Title page,
Item [54], "OPTICAL WRITING HEAD COMPRISING SELF-SCANNING LIGHT-EMITTING ELEMENT ARRAY" should read -- OPTICAL WRITING HEAD USING A SELF-SCANNING LIGHT-EMITTING ELEMENT ARRAY --.
Item [30], Foreign Application Priority Data, "May 24, 1999 (JP) 2000-152913" should read -- May 24, 2000 (JP) 2000-152913 --.

Column 1,
Line 1, "OPTICAL WRITING HEAD COMPRISING" should read -- OPTICAL WRITING HEAD USING A --.

Column 5,
Line 16, "a range of about - 1--2 volts." should read -- a range of about - 1 - - 2 volts. --

Column 7,
Line 22, "electromagnetic" should read -- electro-magnetic --.

Signed and Sealed this

First Day of February, 2005

JON W. DUDAS
*Director of the United States Patent and Trademark Office*